March 25, 1930.  J. H. HICINBOTHEM  1,751,735
SHADE OPERATING MEANS
Filed March 30, 1926   3 Sheets-Sheet 1
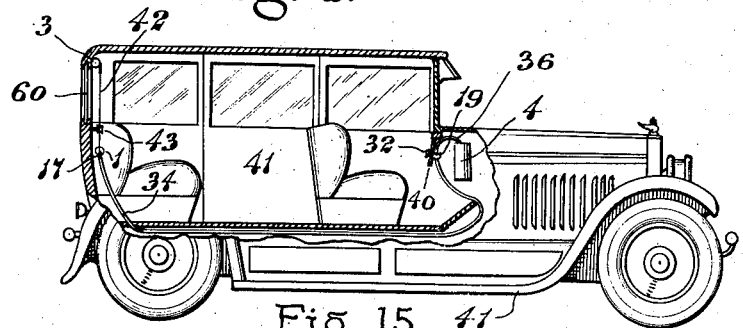
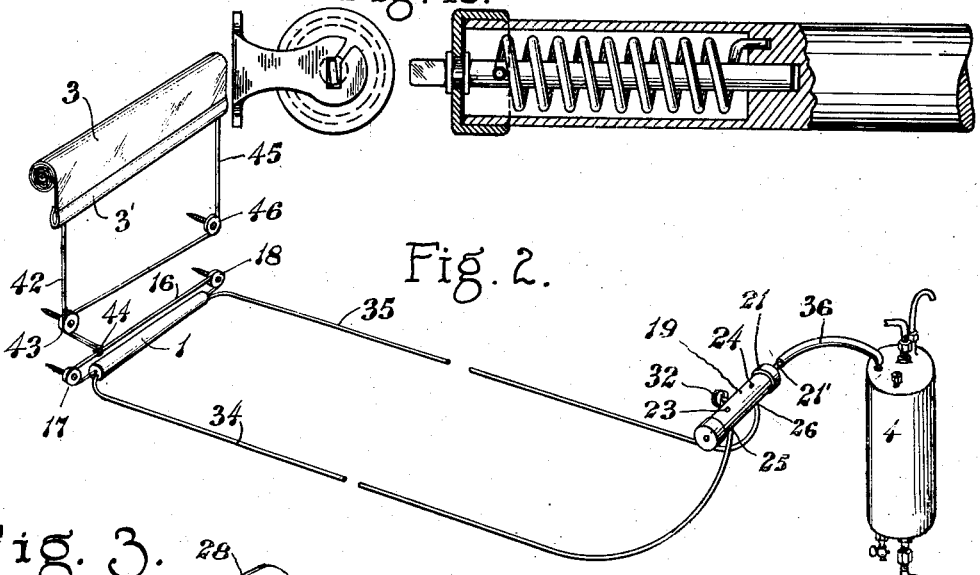
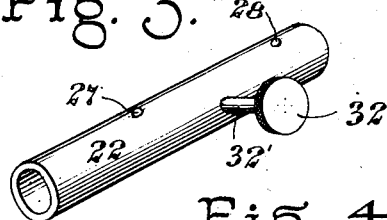
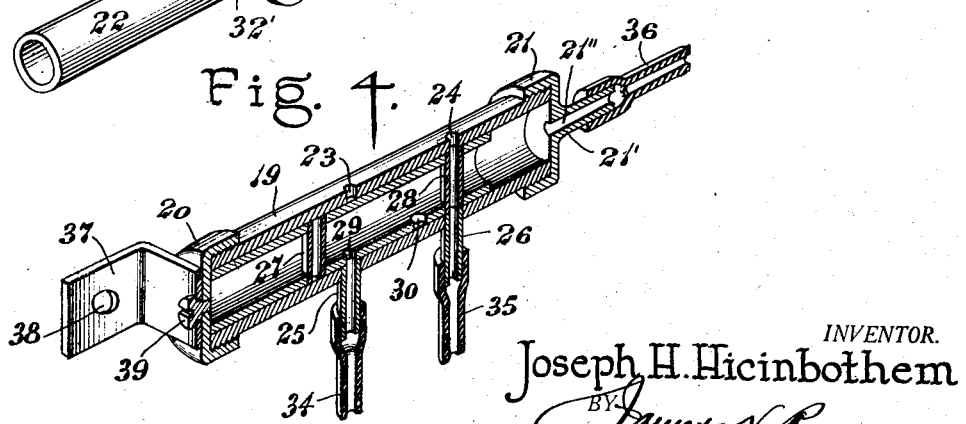
INVENTOR.
Joseph H. Hicinbothem
BY James N. Ramsey
ATTORNEY.

March 25, 1930.  J. H. HICINBOTHEM  1,751,735
SHADE OPERATING MEANS
Filed March 30, 1926  3 Sheets-Sheet 2
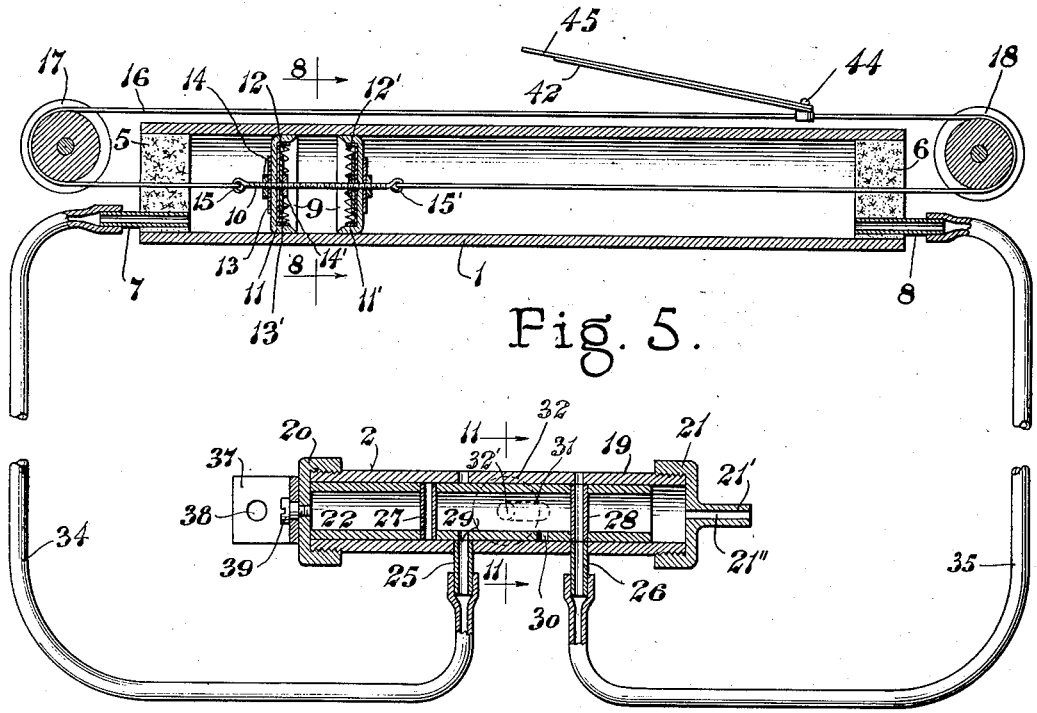
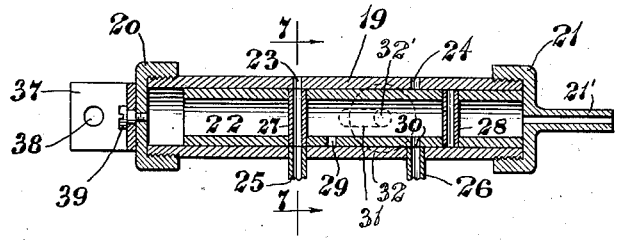
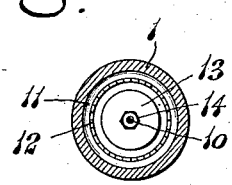
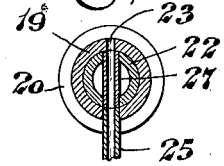
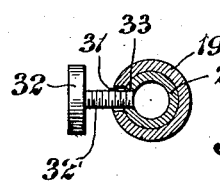
INVENTOR.
Joseph H. Hicinbothem
BY James N. Ramsey
ATTORNEY.

March 25, 1930.  J. H. HICINBOTHEM  1,751,735
SHADE OPERATING MEANS
Filed March 30, 1926    3 Sheets-Sheet 3
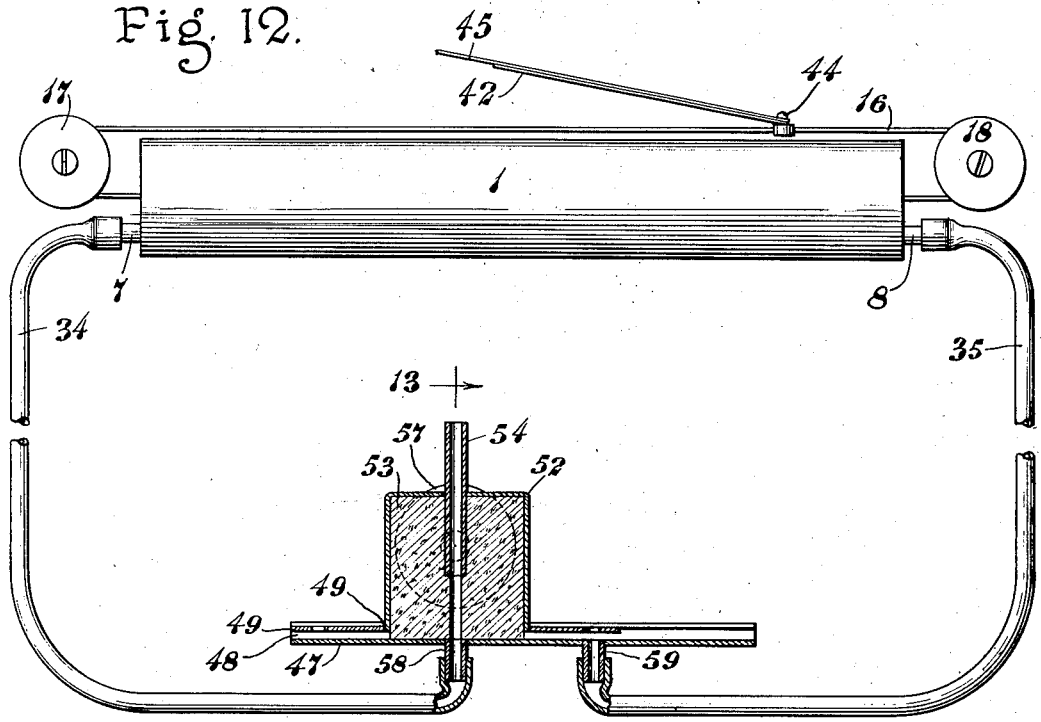
Fig. 12.
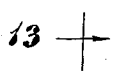
Fig. 13.     Fig. 14.
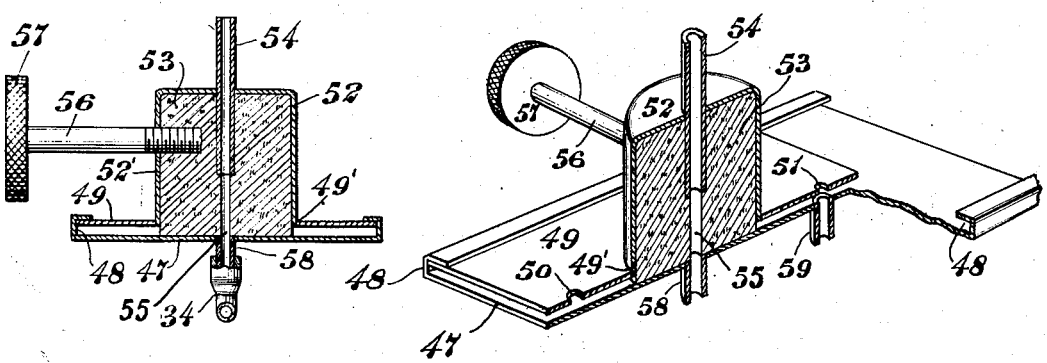
INVENTOR
Joseph H. Hicinbothem
BY James N. Ramsey
ATTORNEY Patented Mar. 25, 1930

1,751,735

UNITED STATES PATENT OFFICE

JOSEPH H. HICINBOTHEM, OF FORT THOMAS, KENTUCKY

SHADE-OPERATING MEANS

Application filed March 30, 1926. Serial No. 98,480.

My invention relates to a novel means for raising and lowering roller curtains or shades for automobiles and like vehicles.

As is well known, when one automobile with head lights is following another car at night the light from the rear car is projected through the rear window of the front car against the wind-shield thereof to such an extent as to produce a glare which blinds the driver of the front car and is liable to result in serious accidents. The objects of my invention are to provide efficient, economical, convenient and easily operated means for raising and lowering the curtain or shade for the rear window of an automobile, in order that he may, without stopping the car or leaving his driving position, draw the blind down when a glare is thus produced upon his windshield and then, when desired, raise the curtain or shade.

My invention consists in providing a cylinder having a plunger, in combination with a usual vacuum tank, together with a suitable valve and connections.

My invention also consists in the construction, combination, location and arrangement of parts and in the several features, as herein set forth and claimed.

In the drawings:

Fig. 1 is a side elevation of an automobile partly broken away to show the invention installed thereon;

Fig. 2 is an isometric view of the invention showing its relation with the roller curtain and vacuum tank;

Fig. 3 is an isometric view of the control valve slide;

Fig. 4 is an isometric view of the control valve shown in longitudinal vertical section;

Fig. 5 is a diagrammatic view of the invention showing the control valve and cylinder in longitudinal vertical section;

Fig. 6 is a longitudinal vertical section of the control valve;

Fig. 7 is a vertical cross section of the control valve taken on a plane corresponding to line 7—7 of Fig. 6;

Fig. 8 is a vertical cross section of the cylinder plunger taken on line 8—8 of Fig. 5;

Fig. 9 is a view of one of the leather cups shown in vertical section;

Fig. 10 is a similar view of one of the leather cup spring retaining members;

Fig. 11 is a transverse cross section of the control valve taken on line 11—11 of Fig. 5;

Fig. 12 is a view similar to Fig. 5 showing a modified construction for the control slide valve;

Fig. 13 is a cross section of the modified control slide valve taken on line 13—13 of Fig. 12;

Fig. 14 is an isometric view of the modified control slide valve shown partly in vertical section; and Fig. 15 is a view partly in section and partly in elevation showing one end of a Hartshorne spring actuated shade roller and means for mounting said end.

In the embodiment of my invention, as illustrated, and which shows a preferred construction, I provide cylinder 1, control valve 2, usual roller curtain 3 and vacuum tank 4. Cylinder 1 is closed at its ends by corks 5 and 6, respectively, which are provided with nipples 7 and 8, respectively. Plunger 9 within said cylinder 1 comprises threaded stem 10 upon which cup leathers 11 and 11', with supporting springs 12 and 12' nested therein, respectively, each leather being mounted and secured in place between washers 13 and 13', by nuts 14 and 14', respectively, screwed upon said threaded stem. Then the ends of threaded stem 10 are formed into eyes 15 and 15'. Wire 16, as shown in Fig. 5, is fastened to eye 15, passes through cork end 5 over pulleys 17 and 18 through cork end 6 and is secured to eye 15'.

Control valve 2 comprises cylinder 19 which is closed at one end by cap 20 and at the other end by cap 21. Control valve slide 22 comprises a slidable tube which snugly fits within and is shorter than said cylinder 19, thereby allowing said slide to have a reciprocating movement longitudinally within said cylinder. Said cylinder 19 is provided with openings 23 and 24, respectively, and oppositely disposed nipples 25 and 26, as shown in Figs. 3, 4, 5 and 6. Valve slide 22 is provided with transverse tubes 27 and 28 which extend therethrough and with intermediate holes 29 and 30, respectively. Cylinder 19 also has longitudinal slot 31 through which threaded shank 32' of hand operated knob 32 extends, the end of said shank being screwed into hole 33 in valve slide 22. Rubber hose 34 connects nipple 25 with nipple 7 and hose 35 connects nipple 26 with nipple 8, as clearly shown in Fig. 5. Rubber hose 36 connects nipple 21' of cap 21 with an opening in vacuum tank 4. Bracket 37 having hole 38 therein is securely attached to cap 20 by screw 39. Said bracket is for the purpose of mounting said valve 2 upon dashboard 40 of automobile 41. Light-gage wire or cord 42 has one end fastened to the lower edge 3' of curtain 3 and passes around pulley 43 and is connected to holding member 44 fixed to wire 16. Cord or wire 45 is also fixed to the lower edge 3' of curtain 3 and passes under pulley 46 and over pulley 43 and is secured to holding member 44 fixed to wire 16.

In Figs. 12, 13 and 14, I show a modified form for the control valve 2. This valve comprises plate 47, the edges of which are bent laterally and inwardly to form channels 48. Plate 49 fits within channels 48, as shown in Figs. 12, 13 and 14, and is provided with holes 50 and 51. Thimble 52 is soldered to plate 49 at 49' and receives cork 53. Tube 54 is inserted through thimble 52 and into cork 53 and connects with hole 55 in said cork. Shank 56 of hand-operated knob 57 is screwed into wall 52' of thimble 52. Plate 47 is provided with nipples 58 and 59 which are connected to nipples 7 and 8 on cylinder 1 by rubber hose 34 and 35, respectively.

The operation of my device is as follows:
Assuming that the roll curtain 3, located at the top of rear window 60 of automobile 41, is in the rolled position, as shown in Fig. 1, the plunger 9 will be located in the cylinder 1 near cork end 6. Then, should it be desired to pull the curtain 3 down, thereby covering window 60, it is only necessary to grasp hand operated knob 32 and shift or slide it to the position shown by dotted lines in Fig. 5. This in turn slides control-valve-slide 22 to the position shown in Fig. 5. When the control valve slide 22 is in this position the suction in vacuum tank 4 draws through rubber hose 36, nipple 21, hole 29 in said slide valve, nipple 25, rubber hose 34 and nipple 7, thereby drawing plunger 9 and holding-member 44 to the position shown in Fig. 5. When holding-member 44 fixed to wire 16 is in this position (Fig. 5) wires 42 and 45, being connected to said holding-member 44 and lower edge 3' of curtain 3, pull down said curtain.

When the slide valve is in the position just described and the suction in vacuum tank 4 is drawing plunger 9 towards cork-end 5, air is permitted to enter cylinder 1 behind plunger 9 through hole 24, tube 28, nipple 26, rubber hose 35 and nipple 8 (Fig. 5).

The foregoing description pertains to the mechanism when the curtain is being pulled down. To automatically raise curtain 3, simply slide control-valve-slide 22 to the position shown by dotted lines in Fig. 6. This allows the suction in vacuum tank 4 to draw through rubber hose 36, nipple 21, hole 30, nipple 26, rubber hose 35 and nipple 8, thereby drawing plunger 9 towards cork-end 6 and holding-member 44 towards pulley 17, thereby releasing the tension on wires 42 and 45 which allows the usual spring within the curtain roller to rewind curtain 3 upon said roller. During the time plunger 9 is being drawn towards cork-end 6 air is permitted to enter cylinder 1 behind said plunger 9 though hole 23, tube 27, nipple 25, rubber hose 34 and nipple 7. It will be clearly seen that to operate curtain 3 from the driver's seat of automobile 41, all that is necessary is to slide hand operated knob 32 in either direction according to the desired position of the curtain.

The modified slide valve, shown in Figs. 12, 13 and 14 is operated the same as slide valve 2, the nipples 58 and 59, respectively, being connected to rubber hose 34 and 35, and tube 54 being connected to vacuum tank 4 by hose 36.

Occasion often arises where the driver is the only occupant of the automobile 41. Heretofore under these circumstances the driver had to stop said automobile in order to pull down curtain 3. It is often necessary to pull the curtain down, as for instance, a rearwardly approaching automobile may have bright lights which shine through the rear window on the wind-shield of the front automobile which tends to blind the driver of said latter automobile. The driver of an automobile having my invention installed thereon can operate the rear curtain by simple adjustment of hand operated knob 32 located on the dash or any other convenient place.

While I have set forth a particular illustrative embodiment of my invention, it will be understood that certain modifications and changes can be made without departing from the scope or spirit thereof as defined in the claims.

What I claim as new and desire to secure by Letters Patent is:

1. In means of the character described, a vacuum tank, a cylinder, a plunger slidably mounted in said cylinder, a wire operatively connected to each side of said plunger, a control valve for said plunger comprising a plate having its outer edges bent to form channeled retaining members and having openings therein, tubes connecting each end of said cylinder with said valve, a second plate adapted to slide within said channeled retaining members, and having air openings therein adapted to alternately register with openings in said first-mentioned plate, a hollow-member secured to said sliding-plate, a cork inserted in said hollow-member and frictionally engaging said channeled plate, a hollow connection extending from said vacuum tank through said cork to form communication with opposite sides of the cylinder and means for moving said hollow member.

2. In a curtain operating means of the character described, the combination of a vacuum tank, a cylinder, a plunger movable endwise within the cylinder, flexible means attached to each end of said plunger, a pair of pulleys over which said flexible means is adapted to travel and a control valve to form communication with said cylinder and vacuum tank whereby said plunger can be moved in either direction within said cylinder so as to raise or lower said curtain as desired.

3. In curtain operating means of the character described, a vacuum tank, a cylinder, a plunger movable endwise therein, a wire operatively connected to each end of said plunger, a pair of pulleys adapted to support said wire, a holding member fixed to said wire, a control valve for said plunger, means connecting said control valve with each end of said cylinder, means connecting said control valve with said vacuum tank, and means connecting said holding member with said curtain whereby when said plunger is moved within said cylinder said curtain will be raised or lowered, depending upon the position of said control valve.

JOSEPH H. HICINBOTHEM.